(12) United States Patent
Kitagawa

(10) Patent No.: US 10,657,860 B2
(45) Date of Patent: May 19, 2020

(54) SENSOR INFORMATION PROCESSING APPARATUS, SENSOR INFORMATION PROCESSING METHOD, AND SENSOR INFORMATION PROCESSING PROGRAM

(71) Applicant: SUMITOMO ELECTRIC INDUSTRIES, LTD., Osaka-shi, Osaka (JP)

(72) Inventor: Tsukasa Kitagawa, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/542,988

(22) PCT Filed: Jan. 25, 2016

(86) PCT No.: PCT/JP2016/052022
§ 371 (c)(1),
(2) Date: Jul. 12, 2017

(87) PCT Pub. No.: WO2016/163131
PCT Pub. Date: Oct. 13, 2016

(65) Prior Publication Data
US 2018/0018911 A1  Jan. 18, 2018

(30) Foreign Application Priority Data

Apr. 9, 2015 (JP) .................................. 2015-079854

(51) Int. Cl.
*G09G 3/04* (2006.01)
*G06F 3/0481* (2013.01)
(Continued)

(52) U.S. Cl.
CPC .......... *G09G 3/04* (2013.01); *G06F 3/04817* (2013.01); *G08B 5/36* (2013.01); *G09G 3/005* (2013.01);
(Continued)

(58) Field of Classification Search
CPC .. G09G 3/04; G09G 3/005; G09G 2320/0613; G06F 3/04817; G08B 5/36;
(Continued)

(56) References Cited

U.S. PATENT DOCUMENTS 5,790,424 A * 8/1998 Sugihara .................. G07C 3/00
                                                        340/500
2007/0101290 A1 * 5/2007 Nakashima .......... G01C 21/265
                                                        715/797
(Continued)

FOREIGN PATENT DOCUMENTS

| JP | H03-170022 A | 7/1991 |
| JP | 2002-6687 A  | 1/2002 |

(Continued)

*Primary Examiner* — Michael P Nghiem
*Assistant Examiner* — Dacthang P Ngo
(74) *Attorney, Agent, or Firm* — Faegre Drinker Biddle & Reath LLP

(57) ABSTRACT

A sensor information processing apparatus according to an embodiment of the present invention includes: an obtainment unit configured to obtain sensor information indicating a result of measurement performed by a sensor; a display control unit configured to perform control of displaying on a screen an icon indicating the sensor; and a determination unit configured to determine presence/absence of abnormality regarding the sensor information obtained by the obtainment unit, wherein in a state where the display control unit is performing control of selectively displaying on the screen the icon of the sensor having been designated, and when abnormality has been determined by the determination unit, the display control unit performs control of displaying on the (Continued)

screen a target icon irrespectively of presence/absence of designation thereof, the target icon being an icon of a sensor that corresponds to the sensor information for which abnormality has been determined.

9 Claims, 11 Drawing Sheets

(51) Int. Cl.
G08B 5/36 (2006.01)
G09G 3/00 (2006.01)
H04Q 9/00 (2006.01)

(52) U.S. Cl.
CPC ....... *H04Q 9/00* (2013.01); *G09G 2320/0613* (2013.01); *H04Q 2209/40* (2013.01); *H04Q 2209/823* (2013.01)

(58) Field of Classification Search
CPC . H04Q 2209/40; H04Q 9/00; H04Q 2209/823
USPC ........................................................ 702/116
See application file for complete search history.

(56) References Cited

U.S. PATENT DOCUMENTS

| 2015/0338447 A1* | 11/2015 | Gallo | G01D 1/18 |
| | | | 340/600 |
| 2015/0382084 A1* | 12/2015 | Gallo | H04Q 9/00 |
| | | | 340/870.01 |

FOREIGN PATENT DOCUMENTS

| JP | 2003-131708 A | 5/2003 |
| JP | 2004-145741 A | 5/2004 |
| JP | 2006-208000 A | 8/2006 |
| JP | 2009-151398 A | 7/2009 |
| JP | 2013-35399 A | 2/2013 |
| JP | 2013-80354 A | 5/2013 |

* cited by examiner

ROTATE     EXPAND AND SHRINK

SENSOR INFORMATION PROCESSING APPARATUS, SENSOR INFORMATION PROCESSING METHOD, AND SENSOR INFORMATION PROCESSING PROGRAM

TECHNICAL FIELD

The present invention relates to a sensor information processing apparatus, a sensor information processing method, and a sensor information processing program. In particular, the present invention relates to a sensor information processing apparatus, a sensor information processing method, and a sensor information processing program for displaying icons.

BACKGROUND ART

Various technologies for monitoring the state of a predetermined area have been developed. For example, Japanese Laid-Open Patent Publication No. 2006-208000 (PATENT LITERATURE 1) discloses the following technology. That is, the airflow distribution apparatus for usage in a data center comprises: at least one airflow sensor coupled to a plurality of fans in at least one server in the data center; and a controller coupled to the at least one airflow sensor and configured to monitor airflow for the plurality of fans and control cooling in the data center in accordance with the sensed airflow.

CITATION LIST

Patent Literature

PATENT LITERATURE 1: Japanese Laid-Open Patent Publication No. 2006-208000

SUMMARY OF INVENTION

Technical Problem

In order to monitor the state of a predetermined area, the arrangement of sensors in a predetermined area is displayed on a screen in some cases. In such a case, if a plurality of sensors are arranged in a concentrated manner, a plurality of icons respectively representing the plurality of sensors may overlap one another or be concentrated on the screen, resulting in poor visibility.

In such a case, a method is conceivable in which some icons among the plurality of icons are displayed on the screen or a part of the screen is displayed in an enlarged manner, thereby reducing the number of icons displayed on the screen to improve the visibility. However, for example, when a sensor corresponding to an icon that is no longer displayed on the screen indicates abnormality, a user cannot recognize on the screen the sensor indicating the abnormality.

The present invention has been made in order to solve the above problem. An object of the present invention is to provide a sensor information processing apparatus, a sensor information processing method, and a sensor information processing program which allow, in a configuration where icons representing sensors in a predetermined area are displayed on a screen, a user to more reliably recognize abnormality related to a sensor.

Solution to Problem (1) In order to solve the above problem, a sensor information processing apparatus according to an aspect of the present invention includes: an obtainment unit configured to obtain sensor information indicating a result of measurement performed by a sensor; a display control unit configured to perform control of displaying on a screen an icon indicating the sensor; and a determination unit configured to determine presence/absence of abnormality regarding the sensor information obtained by the obtainment unit, wherein in a state where the display control unit is performing control of selectively displaying on the screen the icon of the sensor having been designated, and when abnormality has been determined by the determination unit, the display control unit performs control of displaying on the screen a target icon irrespectively of presence/absence of designation thereof, the target icon being an icon of a sensor that corresponds to the sensor information for which abnormality has been determined.

(8) In order to solve the above problem, a sensor information processing method according to an aspect of the present invention is a sensor information processing method to be used in a sensor information processing apparatus, and includes: a step of obtaining sensor information indicating a result of measurement performed by a sensor; a step of determining presence/absence of abnormality regarding the sensor information that has been obtained; and a step of performing, in a state where control of selectively displaying on a screen an icon representing the sensor having been designated is being performed, and when abnormality regarding the obtained sensor information has been determined, control of displaying on the screen a target icon irrespectively of presence/absence of designation thereof, the target icon being an icon of a sensor that corresponds to the sensor information for which abnormality has been determined.

(9) In order to solve the above problem, a sensor information processing program according to an aspect of the present invention is a sensor information processing program to be used in a sensor information processing apparatus, and causes a computer to execute: a step of obtaining sensor information indicating a result of measurement performed by a sensor; a step of determining presence/absence of abnormality regarding the sensor information that has been obtained; and a step of performing, in a state where control of selectively displaying on a screen an icon representing the sensor having been designated is being performed, and when abnormality regarding the obtained sensor information has been determined, control of displaying on the screen a target icon irrespectively of presence/absence of designation thereof, the target icon being an icon of a sensor that corresponds to the sensor information for which abnormality has been determined.

The present invention can be realized not only as a sensor information processing apparatus provided with such a characteristic processing unit, but also as a semiconductor integrated circuit that realizes a part or the whole of the sensor information processing apparatus or as a sensor information processing system provided with the sensor information processing apparatus.

Advantageous Effects of Invention

According to the present invention, in a configuration in which icons respectively representing sensors in a predetermined area are displayed on a screen, a user is allowed to more reliably recognize abnormality related to a sensor.

DESCRIPTION OF EMBODIMENTS

Figure 1:
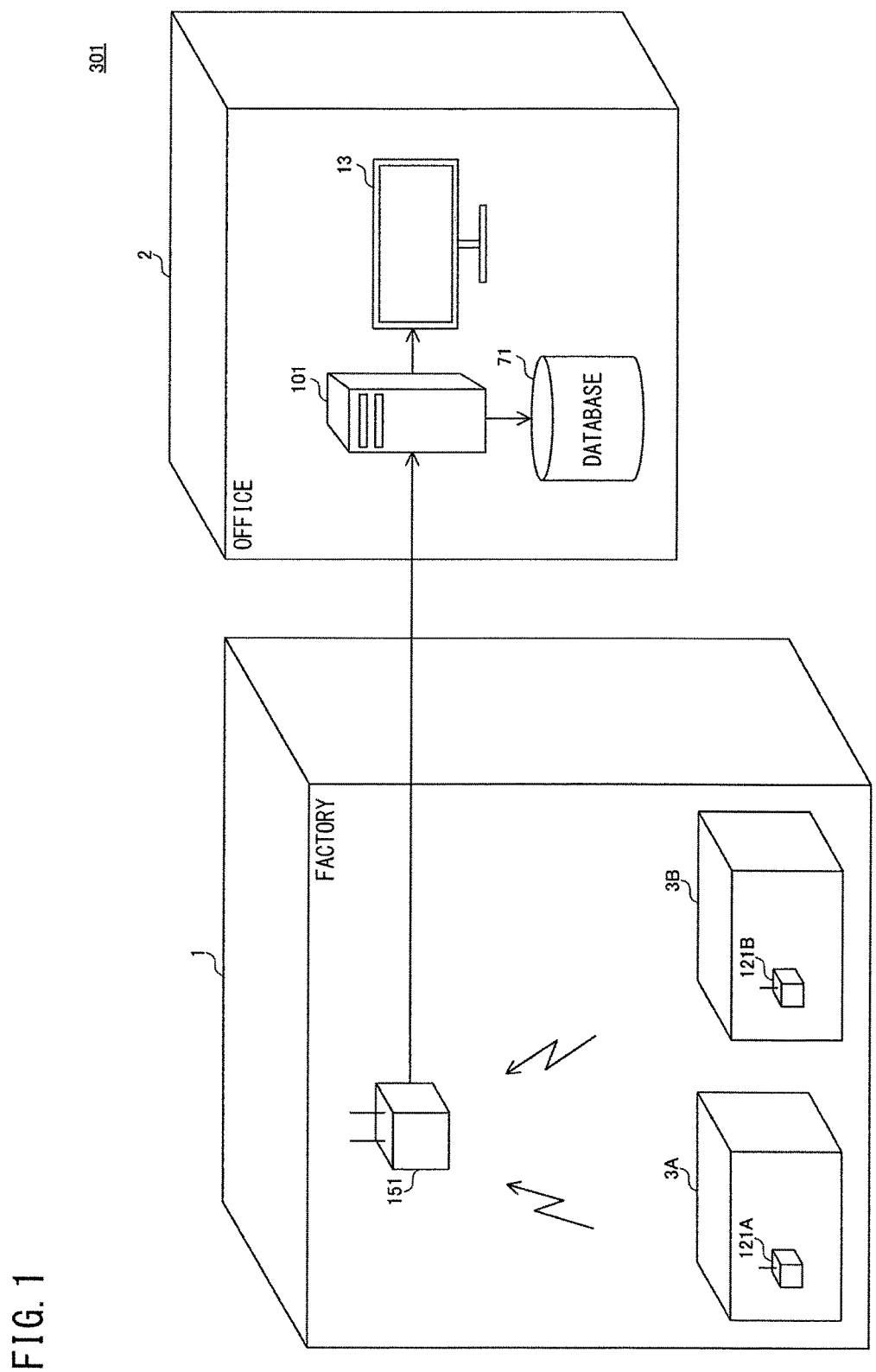
FIG. 1 shows a configuration of a sensor information transmission system according to an embodiment of the present invention.

First, contents of an embodiment of the present invention are listed and described.

(1) A sensor information processing apparatus according to the embodiment of the present invention includes: an obtainment unit configured to obtain sensor information indicating a result of measurement performed by a sensor; a display control unit configured to perform control of displaying on a screen an icon indicating the sensor; and a determination unit configured to determine presence/absence of abnormality regarding the sensor information obtained by the obtainment unit, wherein in a state where the display control unit is performing control of selectively displaying on the screen the icon of the sensor having been designated, and when abnormality has been determined by the determination unit, the display control unit performs control of displaying on the screen a target icon irrespectively of presence/absence of designation thereof, the target icon being an icon of a sensor that corresponds to the sensor information for which abnormality has been determined.

According to this configuration, for example, in a case where a sensor corresponding to an icon excluded from candidates for being displayed on the screen indicates abnormality, the icon can be displayed on the screen. Thus, the user can easily recognize on the screen the sensor indicating the abnormality. Thus, in a configuration in which icons respectively representing sensors in a predetermined area are displayed on a screen, the user is allowed to more reliably recognize abnormality related to a sensor.

(2) Preferably, the display control unit temporally varies a display mode of the target icon.

According to this configuration, the target icon can be made more conspicuous than the other icons on the screen. Thus, the user can more easily recognize on the screen the sensor indicating the abnormality.

(3) Preferably, the display control unit causes an icon other than the target icon not to be displayed.

Thus, according to the configuration in which icons to be displayed on the screen are limited to the target icon, the user can reliably recognize on the screen the sensor indicating the abnormality.

(4) Preferably, the display control unit changes display content of the screen including the target icon, in accordance with content of the abnormality determined by the determination unit.

According to this configuration, the user can easily recognize the content of the abnormality related to the sensor on the basis of the display content on the screen. Thus, for example, the user can perform on the sensor an appropriate process in accordance with the display content of the screen.

(5) More preferably, the display control unit changes the display content of the screen including the target icon, in accordance with length of a time period during which abnormality has been continuously determined by the determination unit or in accordance with magnitude of the number of times by which abnormality has been consecutively determined by the determination unit.

According to this configuration, the abnormality level of the measurement target of the sensor can be more properly evaluated on the basis of the display content of the screen.

(6) More preferably, the display control unit changes the display content of the screen including the target icon, in accordance with magnitude of frequency by which abnormality is determined by the determination unit.

According to this configuration, for example, also in a state where abnormality determination and normality determination are repeated, the abnormality level of the measurement target of the sensor can be more properly evaluated on the basis of the display content of the screen.

(7) More preferably, the display control unit changes the display content of the screen including the target icon, in accordance with magnitude of update frequency of the sensor information by which abnormality has been determined by the determination unit.

According to this configuration, for example, in a case where the degree of importance of sensor information is reflected in the magnitude of the update frequency, the display content of the screen can be changed in accordance with the degree of importance of the sensor information for which abnormality has been determined.

(8) A sensor information processing method according to the embodiment of the present invention is a sensor information processing method to be used in a sensor information processing apparatus, and includes: a step of obtaining sensor information indicating a result of measurement performed by a sensor; a step of determining presence/absence of abnormality regarding the sensor information that has been obtained; and a step of performing, in a state where control of selectively displaying on a screen an icon representing the sensor having been designated is being performed, and when abnormality regarding the obtained sensor information has been determined, control of displaying on the screen a target icon irrespectively of presence/absence of designation thereof, the target icon being an icon of a sensor that corresponds to the sensor information for which abnormality has been determined.

According to this configuration, for example in a case where a sensor corresponding to an icon excluded from candidates for being displayed on the screen indicates abnormality, the icon can be displayed on the screen. Thus, the user can easily recognize on the screen the sensor indicating the abnormality. Therefore, in a configuration in which icons respectively representing sensors in a predetermined area are displayed on a screen, the user is allowed to more reliably recognize abnormality related to a sensor.

(9) A sensor information processing program according to the embodiment of the present invention is a sensor information processing program to be used in a sensor information processing apparatus, and causes a computer to execute: a step of obtaining sensor information indicating a result of measurement performed by a sensor; a step of determining presence/absence of abnormality regarding the sensor information that has been obtained; and a step of performing, in a state where control of selectively displaying on a screen an icon representing the sensor having been designated is being performed, and when abnormality regarding the obtained sensor information has been determined, control of displaying on the screen a target icon irrespectively of presence/absence of designation thereof, the target icon being an icon of a sensor that corresponds to the sensor information for which abnormality has been determined.

According to this configuration, for example in a case where a sensor corresponding to an icon excluded from candidates for being displayed on the screen indicates abnormality, the icon can be displayed on the screen. Thus, the user can easily recognize on the screen the sensor indicating the abnormality. Therefore, in a configuration in which icons respectively representing sensors in a predetermined area are displayed on a screen, the user is allowed to more reliably recognize abnormality related to a sensor.

Hereinafter, embodiments of the present invention will be described with reference to the drawings. In the drawings, the same or corresponding parts are denoted by the same reference numerals, and will not be repeatedly described.

[Configuration and Basic Operation]

FIG. 1 shows a configuration of a sensor information transmission system according to an embodiment of the present invention.

With reference to FIG. 1, a sensor information transmission system 301 includes a display unit 13, a database 71, sensors 121A, 121B, a sensor information processing apparatus 101, and an access point 151. Hereinafter, each of the sensors 121A, 121B is also referred to as a sensor 121. The access point 151 is also referred to as an AP 151.

The sensor information transmission system 301 may be configured to include one sensor 121, or three or more sensors 121. The sensor information transmission system 301 may be configured to include a plurality of APs 151.

The sensor information transmission system 301 is installed in a factory 1 and an office 2 of a business entity, for example. For example, in the sensor information transmission system 301, information regarding facilities 3A, 3B in the factory 1 is collected. In this example, the AP 151 and each sensor 121 are provided in the factory 1, and the display unit 13, the database 71, and the sensor information processing apparatus 101 are provided in the office 2. Hereinafter, each of the facilities 3A, 3B is also referred to as a facility 3.

Each sensor 121 is provided in the facility 3 of the factory 1, for example, and performs measurement regarding a measurement target, specifically, regarding the state and environment of the facility 3 installed in the factory 1, and the operation state of the sensor 121 itself.

More specifically, the sensor 121 measures, for example, temperature, humidity, and infrared illuminance regarding the facility 3, and voltage of a battery used by the sensor 121. The sensor 121 may be configured to measure current, concentration, acceleration, gyro value, pressure, and the like, in addition to temperature, humidity, infrared illuminance, and battery voltage.

The sensor 121 creates sensor information indicating a sensor ID, which is the ID of the sensor 121, and indicating a measurement result, and transmits a radio signal including the created sensor information to the AP 151, for example.

FIG. 1 shows one example case in which: a plurality of the facilities 3 are provided in the factory 1; and one sensor 121 corresponding to each facility 3 is provided in the corresponding facility 3. A configuration may be employed in which some or all of the sensors 121 transmit sensor information to the AP 151 through wired communication.

For example, when the AP 151 receives sensor information from the sensor 121, the AP 151 measures LQI (link quality indication) at the time of reception of the sensor information. The AP 151 causes the measured LQI to be included in the received sensor information, and transmits the sensor information including the LQI to the sensor information processing apparatus 101. The communication between the AP 151 and the sensor information processing apparatus 101 may be wired communication or wireless communication.

For example, when the sensor information processing apparatus 101 has received the sensor information from the AP 151, the sensor information processing apparatus 101 obtains the measurement result of the sensor 121, the LQI of the AP 151, and the sensor ID from the received sensor information, and accumulates, in the database 71, the obtained measurement result and LQI so as to be associated with the sensor ID.

In addition, the sensor information processing apparatus 101 can display the content of the received sensor information on the display unit 13, for example.

[One Example of Screen]

Figure 2:
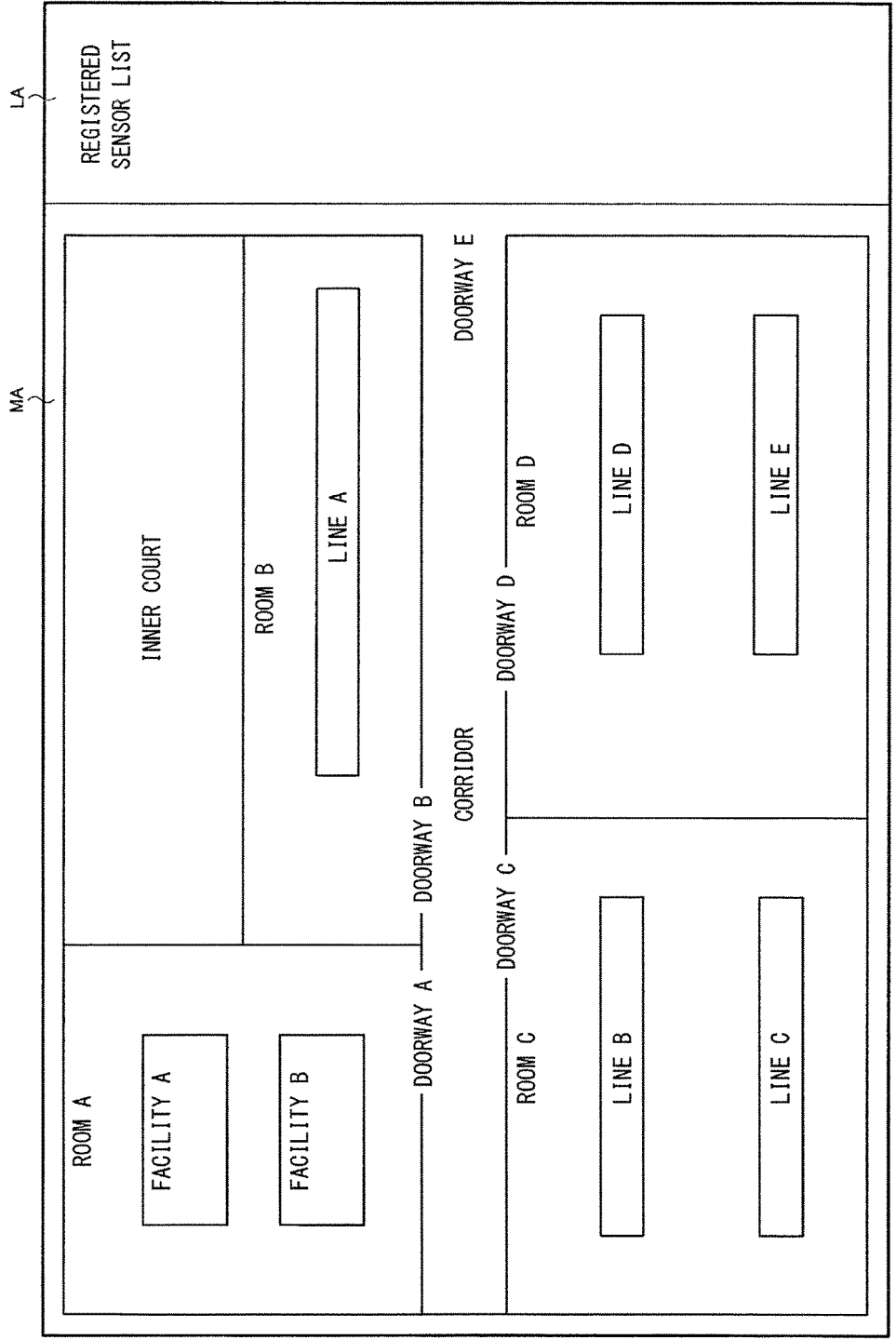
FIG. 2 shows one example of a screen displayed on a display unit in a sensor information processing system according to the embodiment of the present invention.

FIG. 2 shows one example of a screen displayed on a display unit in a sensor information processing system according to the embodiment of the present invention. In FIG. 2, a screen displayed on the display unit when no sensor 121 is registered is shown.

With reference to FIG. 2, the screen includes a map area MA and a list area LA. The screen is a GUI (graphical user interface) that allows a user to monitor the state of a factory F1 which is an area to be monitored, for example.

In the map area MA, for example, the factory layout of the factory F1, i.e., a plan view of the factory F1, is displayed. In addition, in the map area MA, an icon representing a sensor 121 (hereinafter, also referred to as a sensor icon) can be displayed. Details of the sensor icon are described later.

More specifically, in the map area MA, the outlines of rooms A to D, the outline of a corridor, the outline of an inner court, the outlines of facilities A, B, and the outlines of lines A to E are displayed as the factory layout.

In addition, in the map area MA, four doorways A to D between rooms A to D and the corridor, and one doorway E between the corridor and the outside are displayed.

In the list area LA, for example, a registered sensor list is displayed. In the list area LA, the kind of each sensor 121 registered by the user (hereinafter, also referred to as "registered sensor 121") can be displayed. The measurement result and the LQI indicated by sensor information from each registered sensor 121 are targets to be monitored by the sensor information processing apparatus 101.

In the example shown in FIG. 2, since no sensor 121 has been registered by the user, the kind of registered sensor is not displayed in the list area LA.

Figure 3:
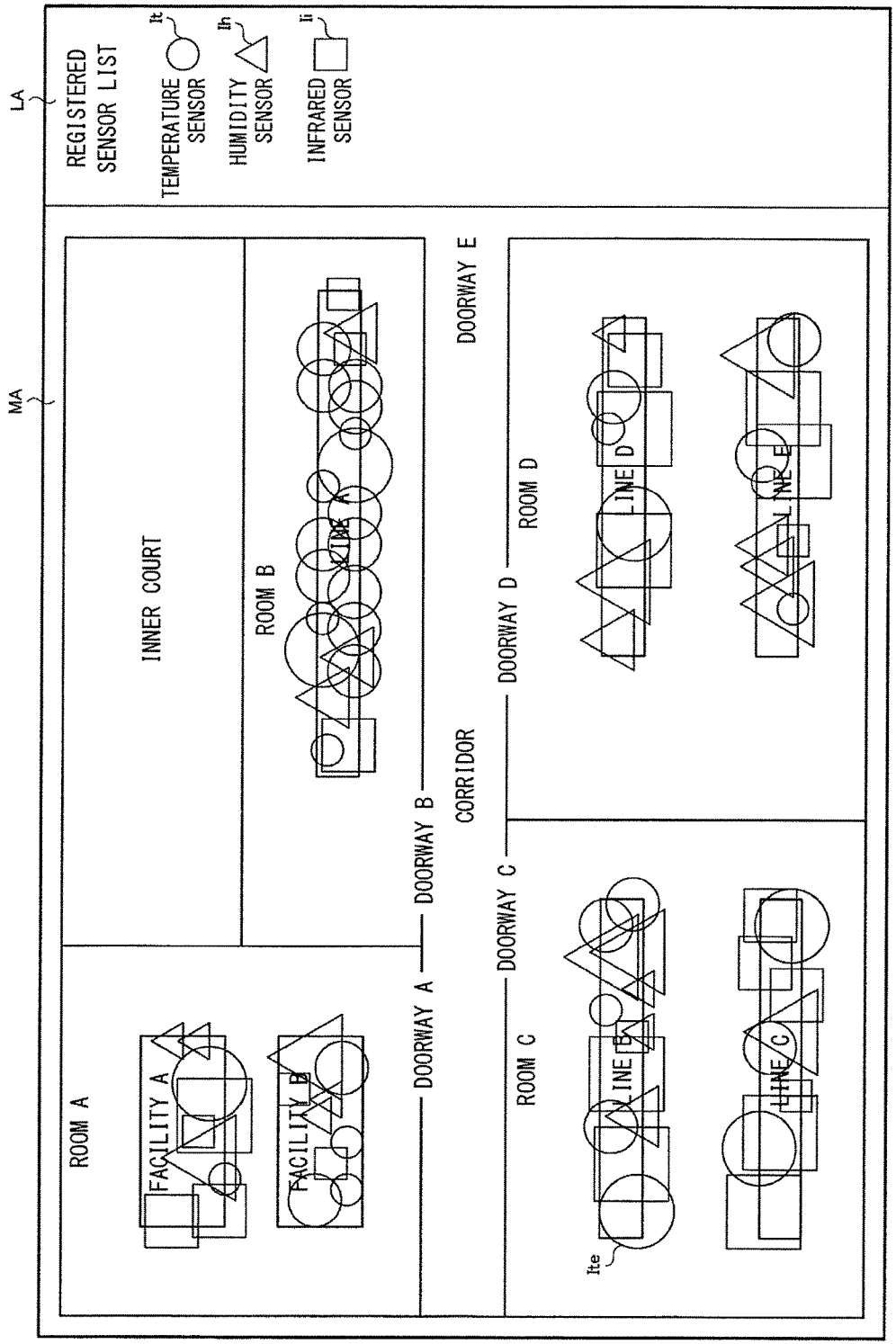
FIG. 3 shows one example of a screen displayed on the display unit in the sensor information processing system according to the embodiment of the present invention.

FIG. 3 shows one example of a screen displayed on the display unit in the sensor information processing system according to the embodiment of the present invention.

FIG. 3 shows a screen that is displayed when: a sensor 121 of which measurement target is temperature (hereinafter, also referred to as "temperature sensor 121"), a sensor 121 of which measurement target is humidity (hereinafter, also referred to as "humidity sensor 121"), and a sensor 121 of which measurement target is infrared illuminance (hereinafter, also referred to as "infrared sensor 121") are registered sensors 121; and all kinds of the registered sensors 121 are designated as the display target by the user, for example.

With reference to FIG. 3, the text indicating the kind of each registered sensor 121 is displayed in the list area LA, for example. Specifically, "temperature sensor", "humidity sensor", and "infrared sensor" respectively indicating the kinds of the temperature sensor 121, the humidity sensor 121, and the infrared sensor 121 are displayed in the list area LA.

For example, for each kind of the registered sensor 121, the user can designate whether to display or not to display a sensor icon in the map area MA. For example, in a case where a sensor icon is displayed to the right of the text indicating the kind of the registered sensor 121, the registered sensor 121 of this kind has been designated as the display target to be displayed in the map area MA by the user.

For example, in the example shown in FIG. 3, since the temperature sensor 121, the humidity sensor 121, and the infrared sensor 121 have been designated as the display target by the user, a circular sensor icon It, a triangular sensor icon Ih, and a square sensor icon Ii are displayed to the right of the texts "temperature sensor", "humidity sensor", and "infrared sensor", respectively.

Three sensor icons are each translucent except the contour thereof. Hereinafter, the circular sensor icon, the triangular sensor icon, and the square sensor icon are also referred to as a circular icon, a triangular icon, and a square icon, respectively. It should be noted that the sensor icon may not be translucent.

As described above, according to the configuration in which the shapes of sensor icons are different from one another in accordance with the kinds of the sensors 121, the user can, on the basis of the shape of each sensor icon, easily recognize the kind of the corresponding sensor 121.

Not limited to the configuration in which sensor icons having different shapes in accordance with the kinds of the sensors 121 are displayed on the screen, a configuration may be employed in which sensor icons having different colors in accordance with the kind of the sensors 121 are displayed on the screen.

In the map area MA, sensor icons designated as the display target are displayed in addition to the factory layout. For example, in FIG. 3, circular icons, triangular icons, and square icons are displayed which respectively represent the temperature sensor 121, the humidity sensor 121, and the infrared sensor 121 which have been designated as the display target by the user.

Each sensor icon in the map area MA is displayed at a position in the map area MA corresponding to the actual position in the factory F1 of the corresponding sensor 121 (hereinafter, also referred to as "aimed display position"), for example.

According to this configuration, on the basis of the position of each sensor icon in the factory layout displayed in the map area MA, the user can recognize the position, in the actual factory F1, of the sensor 121 that corresponds to the sensor icon.

In addition, each sensor icon has a size according to the value indicated by the sensor information from a corresponding sensor 121, for example. Here, the value indicated by the sensor information is, for example, the measurement result of the sensor 121 or the LQI, and can be designated by the user.

Specifically, a sensor icon having a larger size indicates that the value indicated by the sensor information from the corresponding sensor 121 is large. A sensor icon having a small size indicates that the value indicated by the sensor information from the corresponding sensor 121 is small.

According to this configuration, on the basis of the size of each sensor icon, the user can intuitively recognize the magnitude of the value indicated by the sensor information from the corresponding sensor 121.

[Background and Problem]

In an IoT (Internet of Things) society, information is collected by a large number of devices. Thus, in a system for monitoring or observing the collected information, a large number of objects that correspond to the large number of devices are displayed on a screen.

Also in the sensor information transmission system 301, a large number of objects, i.e., a large number of sensor icons, that correspond to a large number of sensors 121 are displayed on the screen as shown in FIG. 3.

As shown in FIG. 3, in a case where a large number of sensor icons are displayed on the screen, even if each sensor icon is translucent except the contour, the portion where the contour portions overlap one another impairs the visibility of the factory layout.

For example, in the room B in the factory layout displayed in the map area MA, the visibility of the "line A" is significantly impaired.

In addition, information from a sensor icon that indicates important information becomes difficult to be noticed and confirmed.

Specifically, for example, in the line A in the room B, since the sensor icons are concentrated, the magnitude of the size of each sensor icon and the kind of each sensor icon are more difficult to be discerned.

In order to solve such problems, the sensor information processing apparatus 101 can designate, as the display target, some sensors 121 among a plurality of registered sensors 121, for example.

Figure 4:
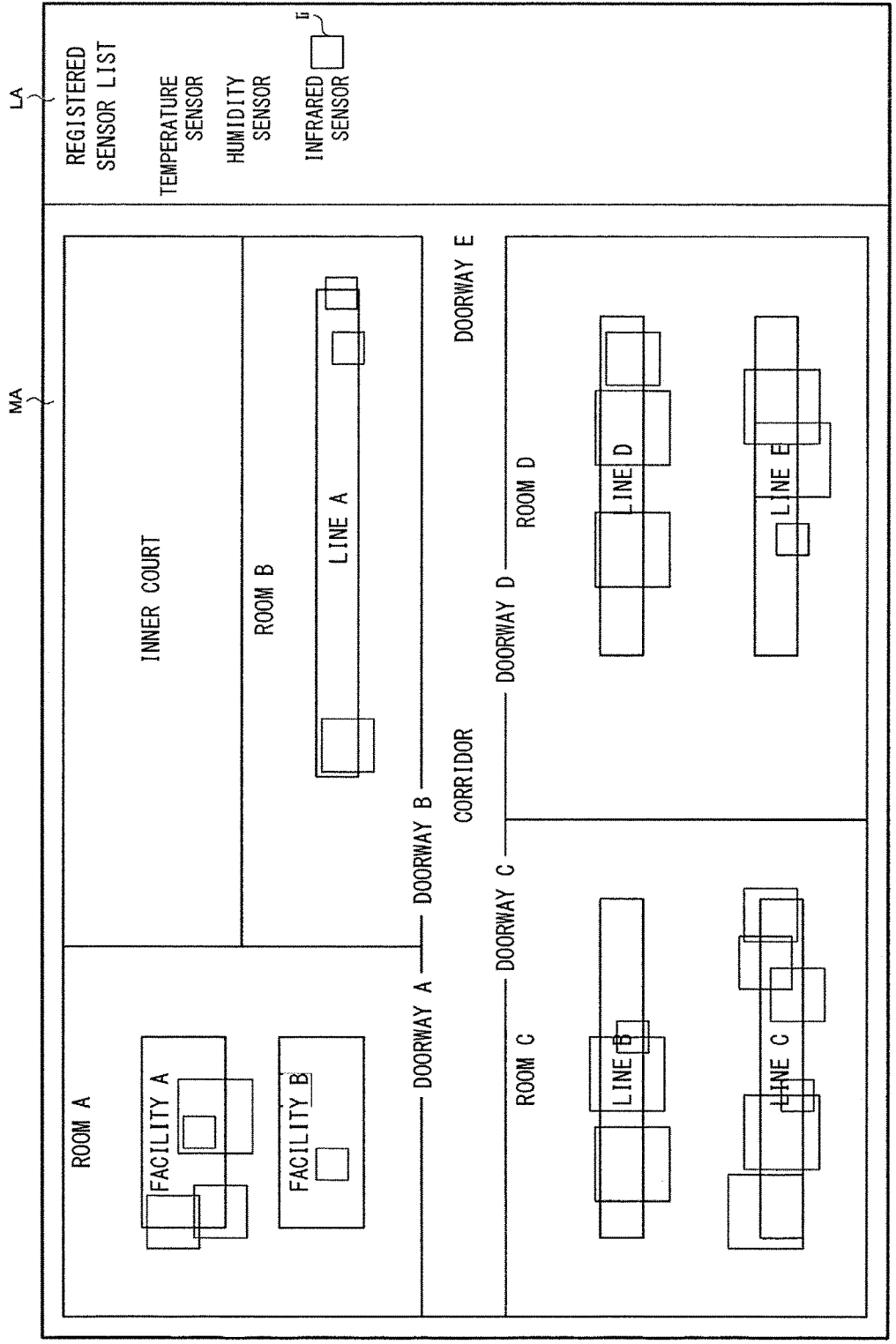
FIG. 4 shows one example of a screen displayed on the display unit in the sensor information processing system according to the embodiment of the present invention.

FIG. 4 shows one example of a screen displayed on the display unit in the sensor information processing system according to the embodiment of the present invention.

FIG. 4 shows a screen that is displayed when: the temperature sensor 121, the humidity sensor 121, and the infrared sensor 121 are registered sensors 121; and the infrared sensor 121 has been designated as the display target by the user, for example.

Compared with the map area MA shown in FIG. 3, in the map area MA shown in FIG. 4, the circular icons and the triangular icons which are not designated as the display target are not displayed, and thus, the degree of impairment of the visibility of the factory layout is reduced.

In addition, the sensor information processing apparatus 101 can limit the display target for the screen, to a part of the factory layout, for example.

Figure 5:
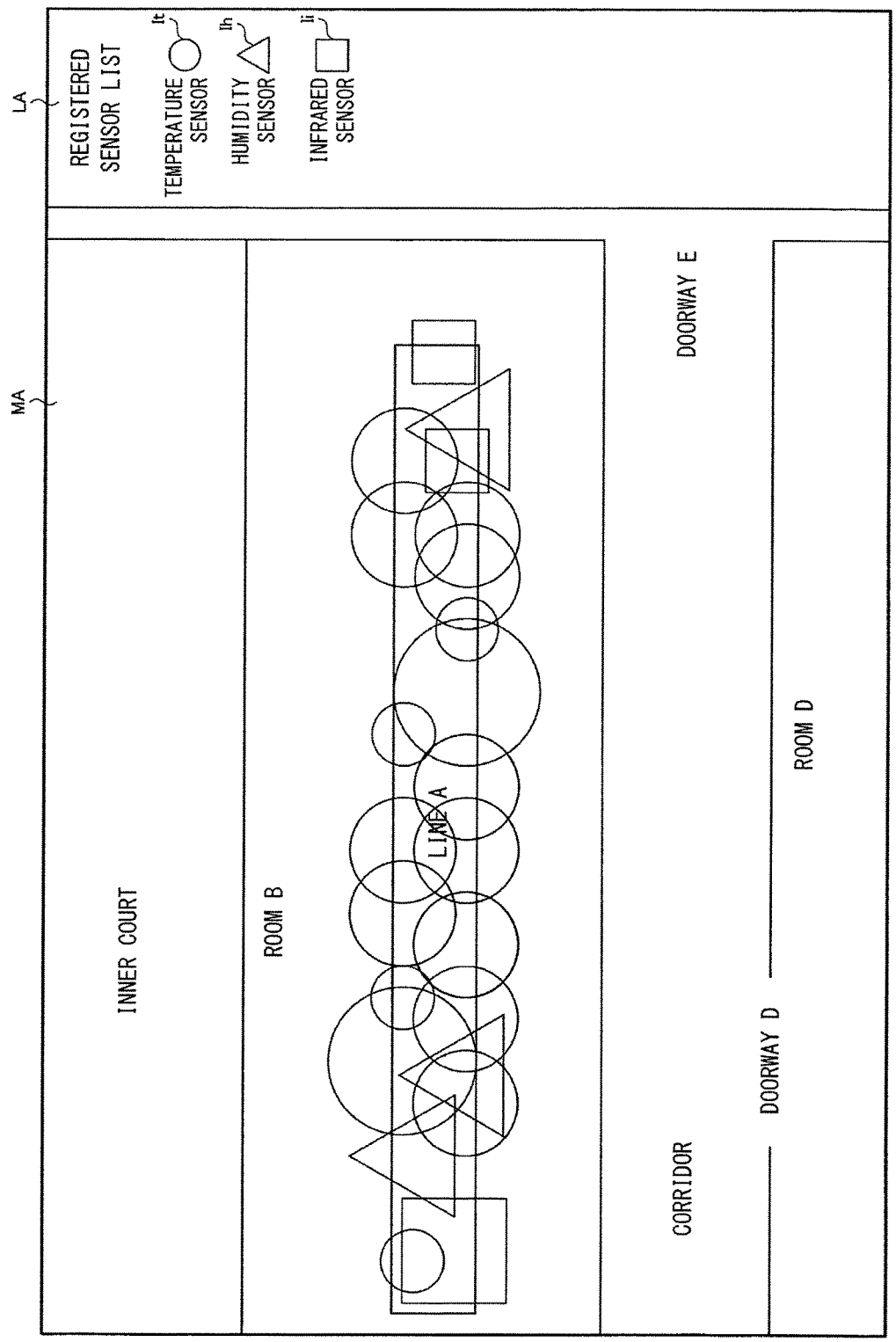
FIG. 5 shows one example of a screen displayed on the display unit in the sensor information processing system according to the embodiment of the present invention.

FIG. 5 shows one example of a screen displayed on the display unit in the sensor information processing system according to the embodiment of the present invention.

FIG. 5 shows a screen on which an enlarged factory layout showing the portion of the line A having concentrated sensor icons is displayed in the map area MA. FIG. 5 shows a screen that is displayed when: the temperature sensor 121, the humidity sensor 121, and the infrared sensor 121 are registered sensors 121; and all the registered sensors 121 have been designated as the display target by the user, for example.

Thus, according to the configuration in which the portion where sensor icons are displayed in a concentrated manner is displayed in an enlarged manner, the degree of impairment of the visibility of the factory layout can be reduced, and the magnitude of the size of each sensor icon and the kind of each sensor icon can be more easily discerned.

However, in a case where the kinds of the sensors 121 to be displayed on the screen are limited as described above, and in a case where a screen that shows a part of the factory layout in an enlarged manner is displayed, it becomes difficult to obtain information of sensors 121 that are not displayed on the screen. This impairs immediate recognition and confirmation of information from such sensor icons and quick responsiveness thereto.

In addition, in order to obtain information from a sensor 121 that is not displayed on the screen, a screen switching process is required. This causes demerits such as increased processing man-hour for the user, induced erroneous operation, and the like.

With reference to FIG. 3 again, for example, when the temperature sensor 121 that corresponds to a sensor icon Ite in the line B in the room C (hereinafter, also referred to as "processing-target sensor 121") indicates a measurement result of abnormality that should be handled by the user, it is difficult for the user to obtain information of the processing-target sensor 121 in a state where the screen shown in FIG. 4 or FIG. 5 is displayed.

This makes it difficult for the user to perform, at an appropriate timing, an abnormality-handling process for the line B which is the measurement target of the processing-target sensor 121.

Therefore, a sensor information processing system 301 according to the embodiment of the present invention solves the above-described problems by the following configurations and operations.

[Configuration of Sensor Information Processing System]

Figure 6:
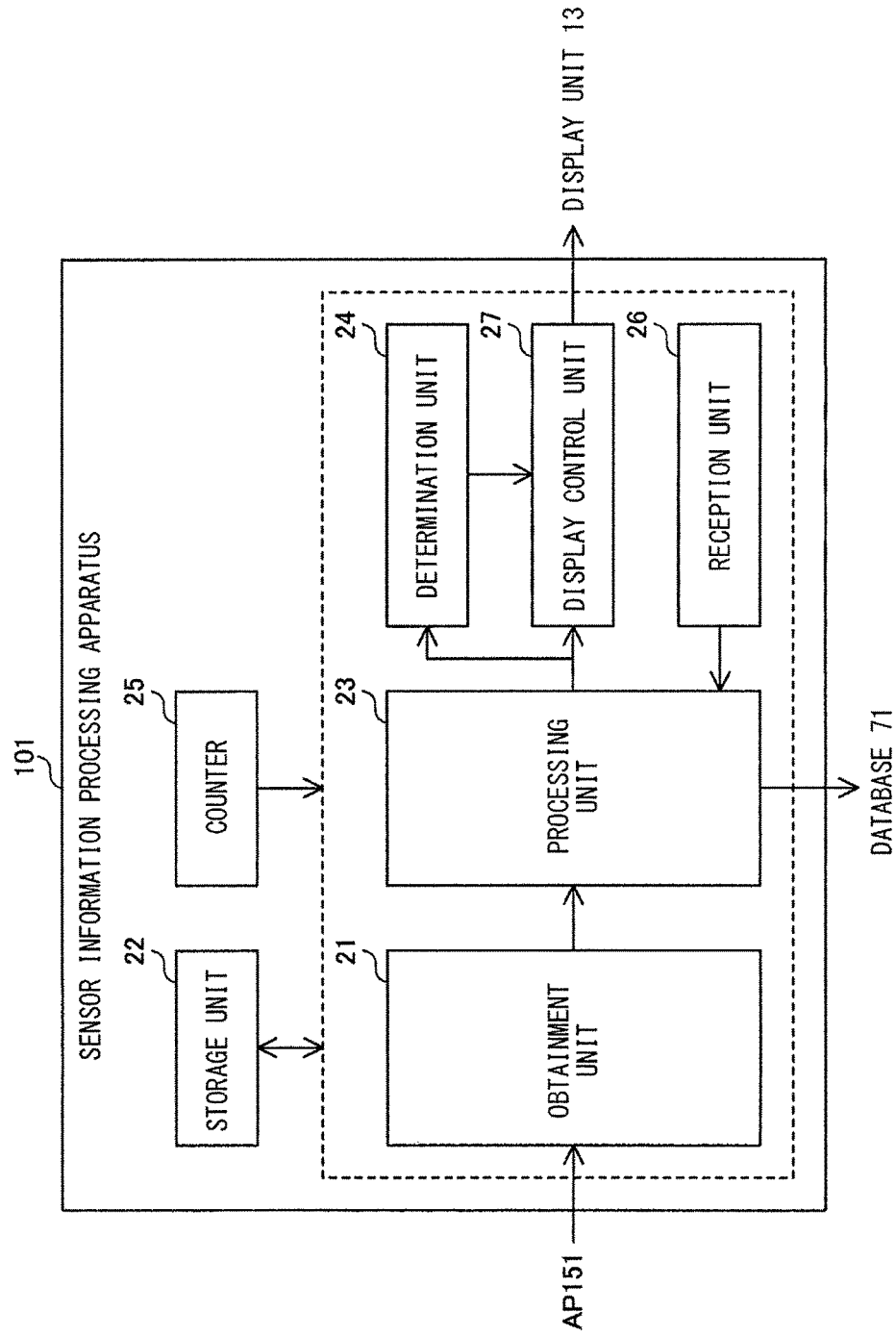
FIG. 6 shows a configuration of the sensor information processing apparatus in the sensor information processing system according to the embodiment of the present invention.

FIG. 6 shows a configuration of the sensor information processing apparatus in the sensor information processing system according to the embodiment of the present invention.

With reference to FIG. 6, the sensor information processing apparatus 101 includes an obtainment unit 21, a storage unit 22, a processing unit 23, a determination unit 24, a counter 25, a reception unit 26, and a display control unit 27. Each of the obtainment unit 21, the processing unit 23, the determination unit 24, the reception unit 26, and the display control unit 27 is implemented by, for example, a processor that performs digital signal processing, such as a CPU (central processing unit) or an MPU (micro-processing unit). These units may be implemented by one processor, or may be implemented by separate processors. The storage unit 22 is implemented by, for example, a memory such as a RAM (random access memory) or a flash memory. The counter 25 includes a logical circuit that counts a clock pulse generated by an oscillation circuit, and the like.

The storage unit 22 retains factory layout information, registered sensor information, designated sensor information and threshold information, for example. Details of these kinds of information are described later.

The counter 25 counts a clock pulse generated by an oscillation circuit or the like that uses a quartz oscillator, and retains the counted value, for example.

The reception unit 26 receives operation performed by the user, for example. More specifically, the reception unit 26 receives operation performed by the user onto the screen of the display unit 13, and outputs, to the processing unit 23, operation information indicating the received content.

[Initial Setting of Sensor Information Processing Apparatus]

One example of initial settings of the sensor information processing apparatus 101 is described below.

(Registration by User)

For example, first, the user registers, in the sensor information processing apparatus 101, the factory layout in the area to be monitored, and sensors 121 provided in the factory F1.

Specifically, for example, the user performs, on the reception unit 26, operation for inputting the outline of the rooms A to D, the outline of the corridor, the outline of the inner court, the outlines of the facilities A, B, and the outlines of the lines A to E, which are shown in FIG. 3.

In addition, onto the reception unit 26, the user performs operation for registering, in the sensor information processing apparatus 101: the position of each sensor 121 disposed in the factory F1; the sensor ID, the kind, and the like of the sensor 121; an abnormality determination threshold group; and a level determination threshold group, for example.

The abnormality determination threshold group includes an LQI threshold indicating the lower limit of communication quality, and a battery threshold indicating the lower limit of the charge amount of a battery, for example.

For example, when the kind of a sensor 121 to be registered is temperature sensor, the abnormality determination threshold group includes a temperature threshold.

For example, when the kind of a sensor 121 to be registered is humidity sensor, the abnormality determination threshold group includes a humidity threshold.

For example, when the kind of a sensor 121 to be registered is infrared sensor, the abnormality determination threshold group includes an infrared threshold.

That is, the LQI threshold and the battery threshold are used in common among different kinds of sensors 121. The temperature threshold, the humidity threshold, and the infrared threshold are used in accordance with the kind of the sensor 121.

The level determination threshold group includes a duration threshold, a consecutive number-of-times threshold, an update frequency threshold, a change frequency threshold, and a divergence threshold, for example. Details of these thresholds are described later.

Onto the reception unit 26, the user performs operation for designating, in the sensor information processing apparatus 101, the kind of a sensor 121 that is to be set as the display target for the display unit 13, and a size threshold to be used in determining the size of a sensor icon representing the sensor 121, for example.

The reception unit 26 creates operation information based on the operation performed by the user, and outputs the created operation information to the processing unit 23, for example.

On the basis of the operation information received from the reception unit 26, the processing unit 23 creates factory layout information indicating the outlines of the rooms A to D, the outline of the corridor, the outline of the inner court, the outlines of the facilities A, B, and the outlines of the lines A to E shown in FIG. 3, and causes the storage unit 22 to retain the created factory layout information, for example.

On the basis of the operation information received from the reception unit 26, the processing unit 23 creates registered sensor information indicating: the position of each sensor 121 to be registered; the sensor ID, the kind, and the like of the sensor 121; the abnormality determination threshold group; and the level determination threshold group, and causes the storage unit 22 to retain the created registered sensor information, for example.

On the basis of the operation information received from the reception unit 26, the processing unit 23 creates designated sensor information indicating the kind of the sensor 121 that is the display target, and causes the storage unit 22 to retain the created designated sensor information, for example.

[Sensor Icon Displaying Process]

The obtainment unit 21 obtains sensor information indicating a result of measurement performed by each sensor 121. More specifically, when the obtainment unit 21 has received sensor information from a sensor 121 via the AP 151, the obtainment unit 21 outputs the received sensor information to the processing unit 23, for example.

When the processing unit 23 has received the sensor information from the obtainment unit 21, the processing unit 23 obtains the sensor ID, the measurement result of the sensor 121, and the LQI from the received sensor information, and accumulates, in the database 71, the obtained measurement result of the sensor 121 and the obtained LQI so as to be associated with the sensor ID. In addition, the processing unit 23 outputs the sensor information to the determination unit 24 and the display control unit 27.

The display control unit 27 performs control of displaying, on screen of the display unit 13, an icon indicating the position of each sensor 121. For example, the display control unit 27 performs control of selectively displaying, on the screen, an icon of a sensor 121 that has been designated by the user.

Specifically, when the display control unit 27 has received the sensor information from the processing unit 23, the display control unit 27 performs control of displaying on the screen a sensor icon according to the content of the received sensor information, on the basis of the registered sensor information, the designated sensor information, and the factory layout information which are stored in the storage unit 22, for example.

More specifically, on the basis of the registered sensor information, the display control unit 27 obtains the kind of the sensor 121 that corresponds to the sensor ID indicated by the sensor information. Then, on the basis of the designated sensor information, the display control unit 27 determines whether or not the obtained kind of the sensor 121 is the kind of the display target for the screen.

When the display control unit 27 has determined that the obtained kind of the sensor 121 is the kind of the display target for the screen, the display control unit 27 performs the following process, for example.

That is, for example, the display control unit 27 calculates an aimed display position on the basis of the position of the sensor 121 indicated by the registered sensor information and on the basis of the factory layout information. Then, for example, the display control unit 27 performs control of selectively displaying, at the calculated aimed display position, a sensor icon that has a shape according to the obtained kind of the sensor 121. At this time, for example, the display control unit 27 causes the sensor icon to be displayed in a size according to the magnitude relationship between the measurement result indicated by the sensor information and the size threshold indicated by the designated sensor information.

Meanwhile, for example, when the display control unit 27 has determined that the obtained kind of the sensor 121 is not the kind of the display target for the screen, the display control unit 27 does not perform the process of displaying, on the screen, the sensor icon that corresponds to the sensor 121.

[Abnormality Determination Process]

The determination unit 24 determines the presence/absence of abnormality regarding the sensor information obtained by the obtainment unit 21.

Specifically, for example, when the determination unit 24 has received the sensor information from the processing unit 23, the determination unit 24 determines the presence/absence of abnormality regarding the received sensor information, on the basis of the registered sensor information in the storage unit 22.

More specifically, for example, the determination unit 24 obtains, from the registered sensor information, the kind of the sensor 121 that corresponds to the sensor ID and the abnormality determination threshold group indicated by the sensor information.

For example, the determination unit 24 determines the presence/absence of abnormality regarding the sensor information, on the basis of the measurement result or the LQI indicated by the sensor information, and on the basis of the kind of the sensor 121 and the abnormality determination threshold group that have been obtained.

More specifically, when the measurement result of the battery voltage indicated by the sensor information is not greater than the battery threshold, the determination unit 24 determines that the battery charge amount is abnormal.

When the LQI indicated by the sensor information is not greater than the LQI threshold, the determination unit 24 determines that the communication quality is abnormal.

For example, when the kind of the sensor 121 is temperature sensor, the determination unit 24 determines the presence/absence of abnormality in the temperature of the measurement target for the sensor 121, on the basis of the magnitude relationship between the measurement result of the temperature indicated by the sensor information and the temperature threshold.

For example, when the kind of the sensor 121 is humidity sensor, the determination unit 24 determines the presence/absence of abnormality in the humidity of the measurement target of the sensor 121, on the basis of the magnitude relationship between the measurement result of the humidity indicated by the sensor information and the humidity threshold.

For example, when the kind of the sensor 121 is infrared sensor, the determination unit 24 determines the presence/absence of abnormality in the infrared illuminance of the measurement target of the sensor 121, on the basis of the magnitude relationship between the measurement result of the infrared illuminance indicated by the sensor information and the infrared threshold.

For example, when the determination unit 24 has determined abnormality, the determination unit 24 outputs the determination result indicating the abnormality and the sensor ID to the display control unit 27. Meanwhile, for example, when the determination unit 24 has determined normality, the determination unit 24 outputs the determination result indicating the normality and the sensor ID to the display control unit 27.

[Level Evaluation on the Basis of Duration, and Change of Display Content]

For example, in a state where the display control unit 27 is performing control of selectively displaying the icon of a designated sensor 121 on the screen, and when abnormality has been determined by the determination unit 24, the display control unit 27 performs control of displaying on the screen a target icon irrespectively of the presence/absence of designation thereof, the target icon being the sensor icon that corresponds to the sensor information for which the abnormality has been determined.

For example, the display control unit 27 changes the display content of the screen including the target icon, in accordance with the content of the abnormality determined by the determination unit 24.

Specifically, for example, the display control unit 27 changes the display content of the screen including the target icon, in accordance with the length of the time period during which abnormality has been determined by the determination unit 24.

Specifically, for example, the display control unit 27 obtains, from the storage unit 22, the duration threshold in the level determination threshold group indicated by the registration sensor information.

For example, the display control unit 27 monitors, separately for each sensor ID, the determination result received from the determination unit 24. Then, when the determination result indicates abnormality, the display control unit 27 measures, by use of the count value of the counter 25, the duration during which the determination result indicates the abnormality. In addition, the display control unit 27 specifies a processing-target sensor 121 on the basis of the sensor ID that corresponds to the determination result indicating the abnormality.

For example, the display control unit 27 evaluates the abnormality level, every time the display control unit 27 receives a determination result from the determination unit 24. More specifically, for example, when the measured duration is not greater than the duration threshold, the display control unit 27 evaluates that the abnormality is of a low level. When the measured time period is greater than the duration threshold, the display control unit 27 evaluates that the abnormality is of a high level.

Figure 7:
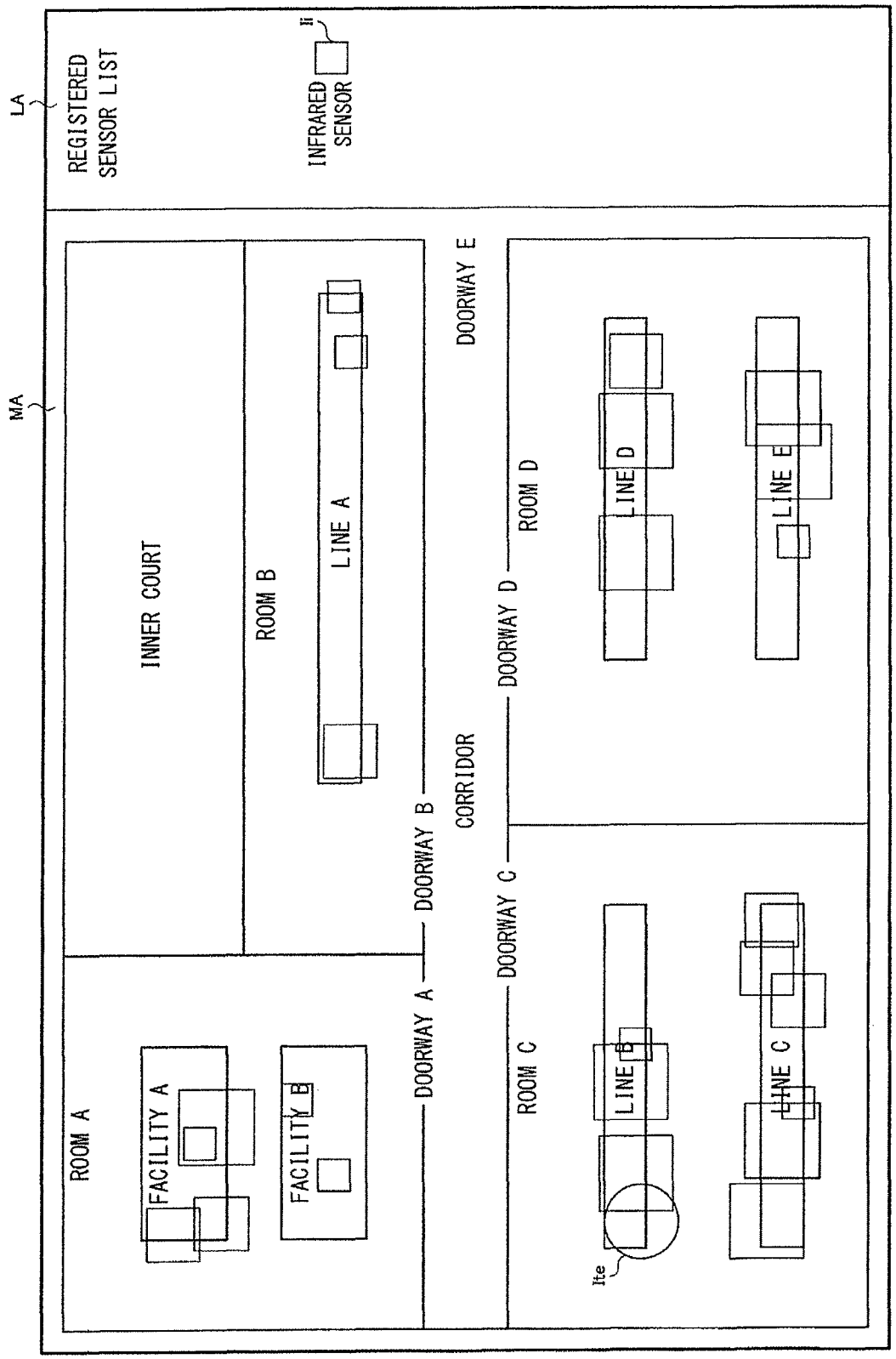
FIG. 7 shows one example of a screen displayed on the display unit in the sensor information processing system according to the embodiment of the present invention.

FIG. 7 shows one example of a screen displayed on the display unit in the sensor information processing system according to the embodiment of the present invention.

With reference to FIG. 7, for example, when the display control unit 27 has evaluated that the abnormality is of a low level, the display control unit 27 performs control of displaying on the screen the sensor icon representing the processing-target sensor 121, i.e., the target icon, irrespectively of the presence/absence of designation thereof.

Specifically, for example, in a state where the display control unit 27 is performing control of displaying the screen shown in FIG. 4 or the screen shown in FIG. 5 in a case where the sensor icon Ite shown in FIG. 3 is the target icon, and when the display control unit 27 has evaluated that the abnormality is of a low level, the display control unit 27 performs control of displaying the screen shown in FIG. 7.

That is, also in a state where the sensor icon Ite has not been designated as the display target by the user as in the screen shown in FIG. 4 or the screen shown in FIG. 5, if the display control unit 27 has evaluated that the abnormality is of a low level, the display control unit 27 performs control of displaying the sensor icon Ite on the screen as in the screen shown in FIG. 7.

In addition, for example, in a state where the display control unit 27 is performing control of displaying the screen shown in FIG. 3, and when the display control unit 27 has evaluated that the abnormality is of a low level, the display control unit 27 continuously performs control of displaying the screen shown in FIG. 3.

Figure 8:
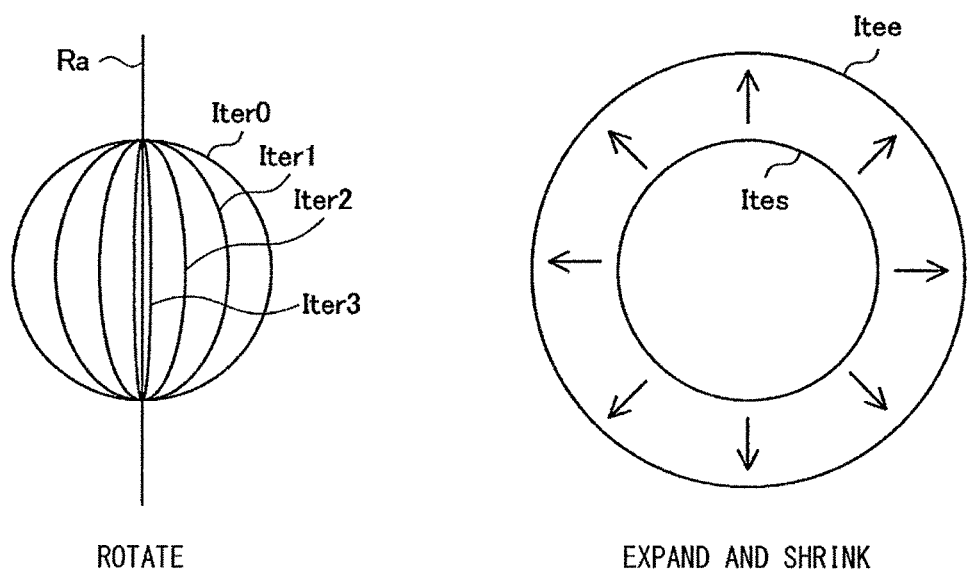
FIG. 8 shows one example of a display mode of a sensor icon in the screen displayed on the display unit in the sensor information processing system according to the embodiment of the present invention.

FIG. 8 shows one example of a display mode of a sensor icon in the screen displayed on the display unit in the sensor information processing system according to the embodiment of the present invention.

With reference to FIG. 8, for example, when the display control unit 27 has evaluated that the abnormality is of a low level, the display control unit 27 performs control of displaying on the screen the target icon representing the processing-target sensor 121, irrespectively of the presence/absence of designation thereof, and performs control of temporally varying the display mode of the target icon.

Specifically, for example, the display control unit 27 temporally varies the shape of the target icon displayed on the screen. At this time, for example, the display control unit 27 performs control of displaying the target icon on the screen after changing the color of the target icon to a color different from the colors of other sensor icons.

For example, the display control unit 27 displays a screen on which the target icon is rotating about a predetermined axis used as a rotation axis. Specifically, for example, the display control unit 27 displays a screen on which the target icon rotates about an axis Ra, used as the rotation axis, that passes through the center of gravity of the target icon.

More specifically, for example, as shown in FIG. 8, the display control unit 27 repeats control of displaying the sensor icon Ite on the screen such that the outline of the sensor icon Ite smoothly varies in the order of Iter0, Iter1, Iter2, Iter3, Iter2, Iter1, and Iter0, with a lapse of time.

Through such control, the user can visually observe the sensor icon Ite rotating about the axis Ra used as the rotation axis.

It should be noted that, when the target icon is not circular unlike in FIG. 8, the display control unit 27 may display a screen on which the target icon rotates about an axis, used as the rotation axis, that is perpendicular to the screen and that passes through the center of gravity of the target icon.

As described above, according to the configuration in which a screen having the target icon rotating thereon is displayed, the target icon can be made more conspicuous than the other sensor icons on the screen. Thus, the user can easily recognize on the screen the sensor indicating the abnormality.

For example, the display control unit 27 performs displaying on the screen such that uniform expansion and uniform shrinkage of the outline of the target icon are repeated.

More specifically, for example, as shown in FIG. 8, the display control unit 27 repeats control of displaying the sensor icon Ite on the screen such that the outline of the sensor icon Ite smooth varies in the order of Itee, Ites, and Itee, with a lapse of time.

Not limited to the configuration in which the display control unit 27 displays the target icon so as to be varied such that the target icon is uniformly expanded from the original size and then is returned to the original size, a configuration may be employed in which the display control unit 27 displays the target icon so as to be varied such that the target icon is uniformly shrunk from the original size and then is returned to the original size, or a configuration obtained by combining these configurations may be employed. The display control unit 27 may repeat non-uniform expansion and non-uniform shrinkage of the entire target icon.

Thus, according to the configuration in which a screen is displayed on which the displayed target icon is expanded and shrunk, the target icon can be made more conspicuous than the other sensor icons on the screen. Accordingly, the user can easily recognize on the screen the sensor indicating the abnormality.

In addition, for example, the display control unit 27 temporally varies the brightness of the target icon. Specifically, for example, the display control unit 27 causes the outline of the sensor icon Ite to blink.

Thus, according to the configuration in which the screen having the blinking target icon thereon is displayed, the target icon can be made more conspicuous than the other sensor icons on the screen. Accordingly, the user can easily recognize on the screen the sensor indicating the abnormality. In addition, for example, also in a case where the target icon is moving on the screen, the target icon can be made more conspicuous than the other sensor icons.

The display control unit 27 may temporally vary both the shape and the brightness of the target icon being displayed on the screen.

Figure 9:
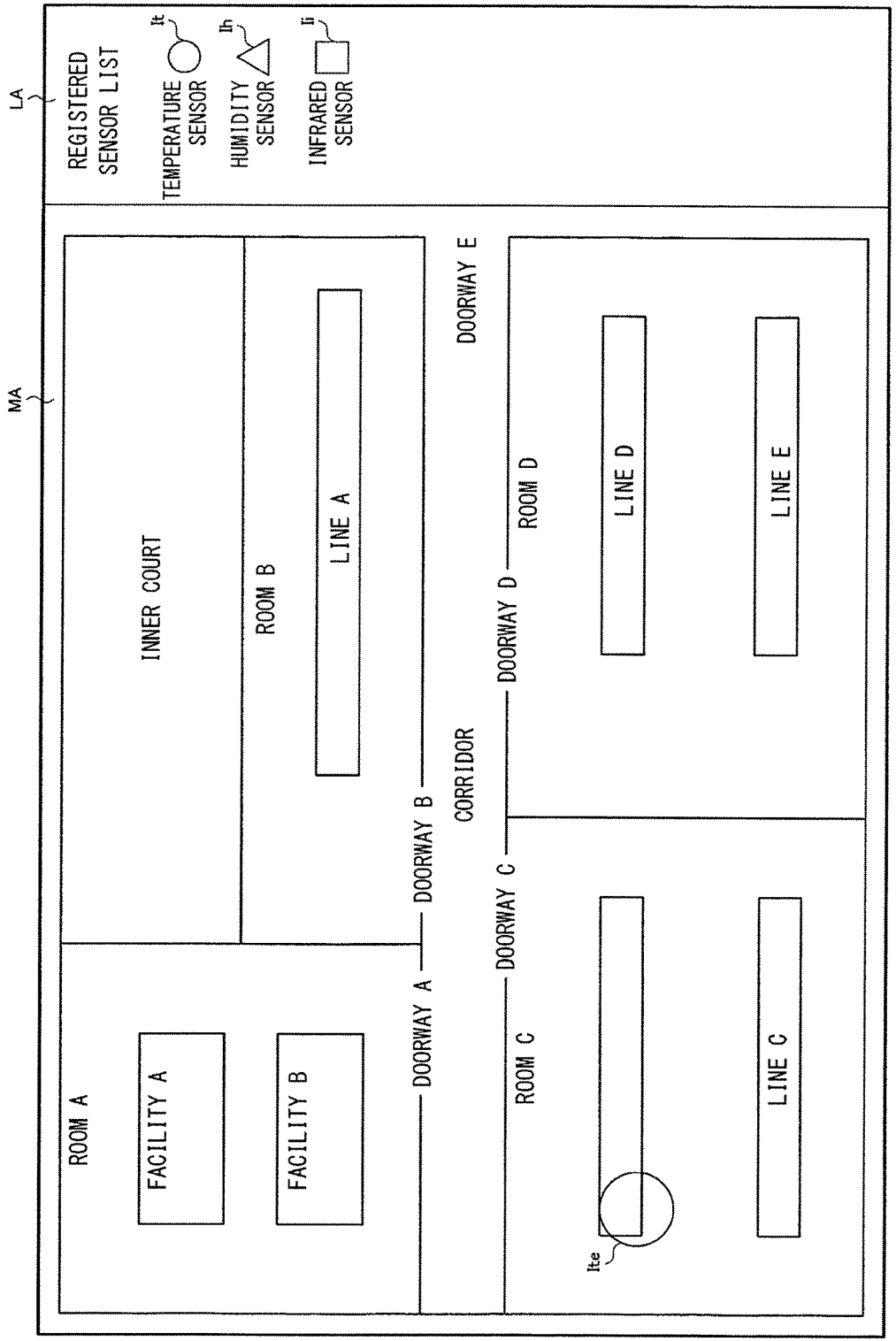
FIG. 9 shows one example of a screen displayed on the display unit in the sensor information processing system according to the embodiment of the present invention.

FIG. 9 shows one example of a screen displayed on the display unit in the sensor information processing system according to the embodiment of the present invention.

With reference to FIG. 9, for example, when the display control unit 27 has evaluated that the abnormality is of a high level, the display control unit 27 performs control of displaying on the screen the target icon representing the processing-target sensor 121, irrespectively of the presence/absence of designation thereof, and causes the other sensor icons than the target icon not to be displayed.

Specifically, for example, in a state where the display control unit 27 is performing control of displaying the screen shown in FIG. 4 or the screen shown in FIG. 5 in a case where the sensor icon Ite shown in FIG. 3 is the target icon, and when the display control unit 27 has evaluated that the abnormality is of a high level, the display control unit 27 performs control of displaying the screen shown in FIG. 9.

That is, also in a state where the sensor icon Ite has not been designated as the display target by the user as in the screen shown in FIG. 4 or the screen shown in FIG. 5, if the display control unit 27 has evaluated that the abnormality is of a high level, the display control unit 27 performs control of displaying the sensor icon Ite on the screen as in the screen shown in FIG. 9, and of deleting the other sensor icons than the sensor icon Ite from the screen.

In addition, for example, while the display control unit 27 is performing control of displaying the screen shown in FIG. 3, and when the display control unit 27 has evaluated that the abnormality is of a high level, the display control unit 27 performs control of displaying the screen shown in FIG. 9.

That is, in a state where the sensor icon Ite has been designated as the display target by the user as in the screen shown in FIG. 3, and when the display control unit 27 has evaluated that the abnormality is of a high level, the display control unit 27 continues displaying the sensor icon Ite on the screen as in the screen shown in FIG. 9, and performs control of deleting the other sensor icons than the sensor icon Ite from the screen.

Thus, according to the configuration in which the icons to be displayed on the screen are limited to the target icon, the user can reliably recognize on the screen the sensor indicating the abnormality.

[Level Evaluation on the Basis of Consecutive Number-of-times]

For example, the display control unit 27 changes the display content of the screen including the target icon, in accordance with the magnitude of the number of times by which abnormality has been consecutively determined by the determination unit 24.

Specifically, for example, the display control unit 27 obtains from the storage unit 22 the consecutive number-of-times threshold in the level determination threshold group indicated by the registration sensor information.

For example, the display control unit 27 monitors, for each sensor ID, the determination result received from the determination unit 24, measures the number of times by which the determination result indicates abnormality, and specifies a processing-target sensor 121 on the basis of the sensor ID that corresponds to the determination result indicating the abnormality.

For example, the display control unit 27 evaluates the abnormality level, every time the display control unit 27 receives a determination result from the determination unit 24. More specifically, for example, when the measured number of times is not greater than the consecutive number-of-times threshold, the display control unit 27 evaluates that the abnormality is of a low level, and when the measured number of times is greater than the consecutive number-of-times threshold, the display control unit 27 evaluates that the abnormality is of a high level.

For example, similarly to the case of evaluating the abnormality level on the basis of the duration, the display control unit 27 changes the display content of the screen including the target icon, in accordance with the evaluated abnormality level.

[Level Evaluation on the Basis of Update Frequency of Sensor Information]

For example, the display control unit 27 changes the display content of the screen including the target icon, in accordance with the magnitude of the update frequency of the sensor information for which abnormality has been determined by the determination unit 24.

Specifically, for example, the display control unit 27 obtains from the storage unit 22 the update frequency threshold in the level determination threshold group indicated by the registration sensor information.

For example, the display control unit 27 calculates, for each sensor ID, the frequency by which the display control unit 27 receives a determination result from the determination unit 24, as the update frequency of the corresponding sensor information.

Here, the update frequency of sensor information corresponds to the transmission cycle of a sensor 121 that transmits the sensor information. For example, the sensor 121 transmits important sensor information at a short transmission cycle, and transmits not so important sensor information at a long transmission cycle.

For example, the display control unit 27 monitors, separately for each sensor ID, the determination result received from the determination unit 24. Then, when the determination result indicates abnormality, the display control unit 27 performs the processing below.

That is, for example, the display control unit 27 specifies a processing-target sensor 121 on the basis of the sensor ID that corresponds to the determination result indicating the abnormality. In addition, when the calculated update frequency is not greater than the update frequency threshold, the display control unit 27 evaluates that the abnormality is of a low level, and when the obtained update frequency is greater than the update frequency threshold, the display control unit 27 evaluates that the abnormality is of a high level.

For example, similarly to the case of evaluating the abnormality level on the basis of the duration, the display control unit 27 changes the display content of the screen including the target icon, in accordance with the evaluated abnormality level.

[Level Evaluation on the Basis of Frequency by which Abnormality is Determined]

For example, the display control unit 27 changes the display content of the screen including the target icon, in accordance with the magnitude of the frequency by which abnormality has been determined by the determination unit 24.

Specifically, for example, the display control unit 27 obtains from the storage unit 22 the change frequency threshold in the level determination threshold group indicated by the registration sensor information.

For example, the display control unit 27 monitors, separately for each sensor ID, the determination result received from the determination unit 24, and measures the number of times of occurrence of abnormality for each sensor ID.

Here, for example, the number of times of occurrence of abnormality is incremented when the determination result indicates normality after indicating abnormality.

For example, the display control unit 27 totals, per unit time, the number of times of occurrence of abnormality measured for each sensor ID, and calculates an abnormality occurrence frequency for each sensor ID.

For example, when the calculated abnormality occurrence frequency is not greater than the change frequency threshold, the display control unit 27 evaluates that the abnormality is of a low level, and when the abnormality occurrence frequency is greater than the change frequency threshold, the display control unit 27 evaluates that the abnormality is of a high level. In addition, for example, the display control unit 27 specifies a processing-target sensor 121 on the basis of the sensor ID that corresponds to the determination result indicating the abnormality.

For example, in a case where the display control unit 27 evaluates the abnormality level on the basis of the abnormality occurrence frequency, the display control unit 27 changes the display content of the screen including the target icon in the following manner.

That is, for example, when the display control unit 27 has evaluated that the abnormality is of a low level, the display control unit 27 performs control of varying the display mode of the target icon in a long cycle, and when the display control unit 27 has evaluated that the abnormality is of a high level, the display control unit 27 performs control of varying the display mode of the target icon in a short cycle.

[Level Evaluation on the Basis of Magnitude of Divergence from Threshold]

In a case where level evaluation on the basis of the magnitude of divergence from a threshold is performed in the sensor information processing apparatus 101, and when, for example, the determination unit 24 has determined abnormality, the determination unit 24 outputs, to the display control unit 27, the magnitude of divergence from the threshold regarding the value of the measurement result or the LQI indicated by the sensor information, in addition to the sensor ID and the determination result indicating the abnormality. Meanwhile, for example, when the determination unit 24 has determined normality, the determination unit 24 outputs the determination result indicating the normality and the sensor ID, to the display control unit 27.

For example, the display control unit 27 changes the display content of the screen including the target icon, in accordance with the magnitude of divergence received from the determination unit 24.

Specifically, for example, the display control unit 27 obtains from the storage unit 22 the divergence threshold in the level determination threshold group indicated by the registration sensor information.

For example, the display control unit 27 monitors, separately for each sensor ID, the determination result received from the determination unit 24, and when the determination result indicates abnormality, the display control unit 27 evaluates the abnormality level.

More specifically, for example, when the magnitude of divergence received from the determination unit 24 is not greater than the divergence threshold, the display control unit 27 evaluates that the abnormality is of a low level, and when the magnitude of the divergence is greater than the divergence threshold, the display control unit 27 evaluates that the abnormality is of a high level. In addition, for example, the display control unit 27 specifies a processing-target sensor 121 on the basis of the sensor ID that corresponds to the determination result indicating the abnormality.

For example, similarly to the case of evaluating the abnormality level on the basis of the abnormality occurrence frequency, the display control unit 27 changes the display content of the screen including the target icon, such as the changing cycle of the display mode of the target icon, in accordance with the evaluated abnormality level.

[Abnormality-handling Process Performed by the User]

As described above, according to the configuration in which control of displaying the screen shown in FIG. 7 or the screen shown in FIG. 9 in accordance with the evaluated abnormality level is performed, the user can recognize that abnormality has occurred in the line B, which is the measurement target of the processing-target sensor 121, on the basis of the screen shown in FIG. 7 or the screen shown in FIG. 9, and can perform a process for handling the abnormality in the line B at an appropriate timing, for example.

For example, when the process for handling the abnormality in the line B has been completed, the user performs, onto the reception unit 26, operation for returning the display of the screen to the original one.

For example, on the basis of operation information received from the reception unit 26, the processing unit 23 creates a screen return command, which is a command for returning the screen shown in FIG. 7 or the screen shown in FIG. 9 to the original screen, and outputs the created screen return command to the display control unit 27.

For example, when the display control unit 27 has received the screen return command from the processing unit 23, the display control unit 27 performs control of returning the screen shown in FIG. 7 or the screen shown in FIG. 9 to the original screen.

[Operation]

The sensor information processing apparatus 101 includes a computer. An arithmetic processing unit such as a CPU in the computer reads out programs including a part or the entirety of steps in the flow chart below from a memory not shown, and executes the programs. Programs for this apparatus can be installed from outside. Programs for this apparatus are distributed in a state of being stored in a storage medium.

Figure 10:
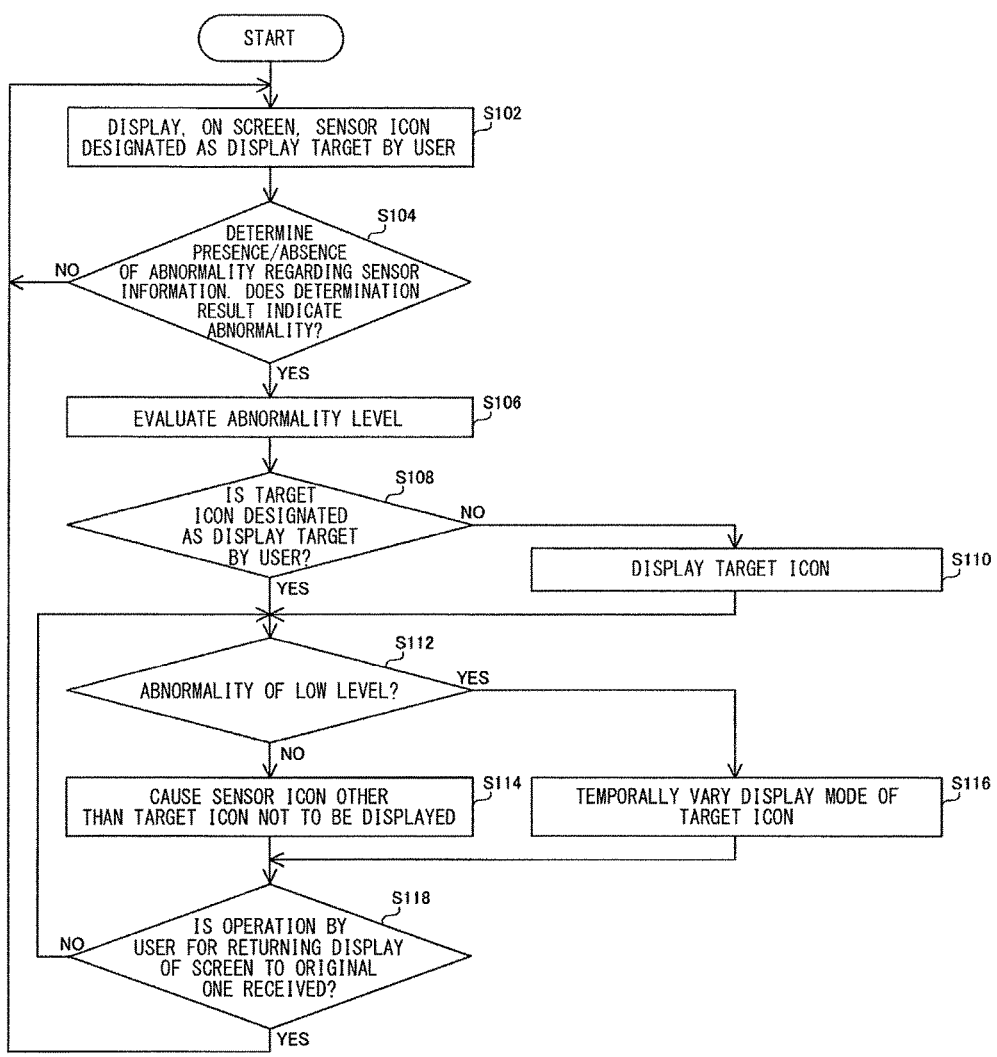
FIG. 10 is a flow chart showing an operation procedure used when the sensor information processing apparatus according to the embodiment of the present invention evaluates the abnormality level to perform control of changing the display content of a screen.

FIG. 10 is a flow chart showing an operation procedure used when the sensor information processing apparatus according to the embodiment of the present invention evaluates the abnormality level to perform control of changing the display content of a screen.

Here, with reference to FIG. 10, operation is described in which, in the sensor information processing apparatus 101, the abnormality level is evaluated on the basis of the duration or the consecutive number-of-times of abnormality determination, or on the basis of the update frequency of sensor information, to perform control of changing the display content of a screen.

First, the sensor information processing apparatus 101 determines the presence/absence of abnormality regarding sensor information transmitted from a registered sensor 121, and until the determination result indicates abnormality (NO in step S104), the sensor information processing apparatus 101 continuously performs control of displaying on the screen sensor icons designated as the display target by the user (step S102).

Next, when the determination result indicates abnormality (YES in step S104), the sensor information processing apparatus 101 evaluates an abnormality level (step S106).

Next, when the target icon has not been designated as the display target by the user (NO in step S108), the sensor information processing apparatus 101 performs control of displaying the target icon (step S110).

Meanwhile, when the target icon has been designated as the display target by the user (YES in step S108), the sensor information processing apparatus 101 performs control of continuously displaying the target icon.

Next, when the evaluated abnormality level is a low level (YES in step S112), the sensor information processing apparatus 101 temporally varies the display mode of the target icon (step S116) until receiving operation performed by the user for returning the display of the screen to the original one (NO in step S118).

Meanwhile, when the evaluated abnormality level is a high level (NO in step S112), the sensor information processing apparatus 101 causes the other sensor icons than the target icon not to be displayed (step S114) until receiving operation performed by the user for returning the display of the screen to the original one (NO in step S118).

Next, when the sensor information processing apparatus 101 has received the operation performed by the user for returning the display of the screen to the original one (YES in step S118), the sensor information processing apparatus 101 continuously performs control of displaying on the screen the sensor icons designated as the display target by the user (step S102), until the determination result indicates abnormality (NO in step S104).

It should be noted that the order of step S106 and steps S108, S110 above is not limited to the above-described order, and may be switched with each other.

Figure 11:
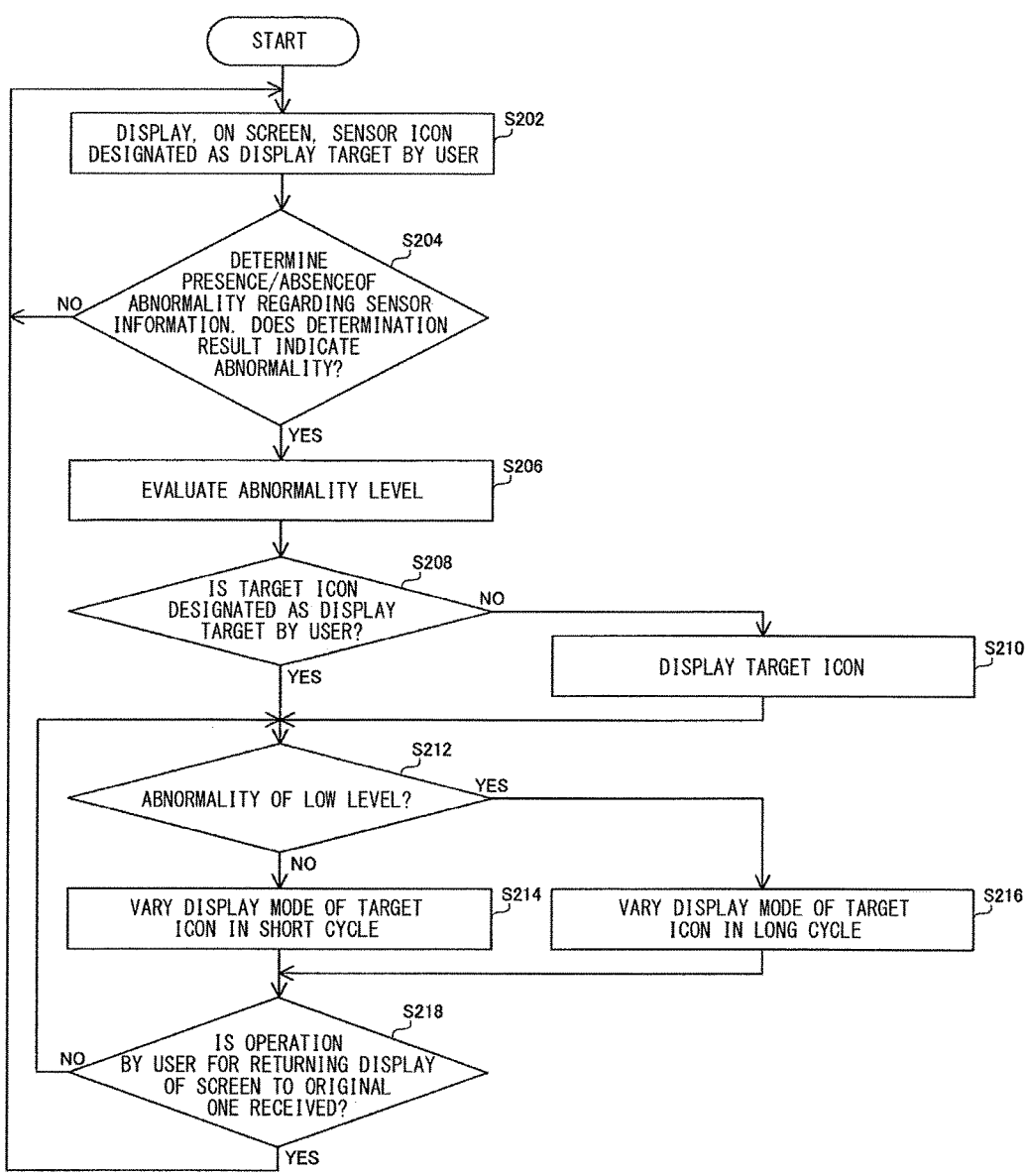
FIG. 11 is a flow chart showing an operation procedure used when the sensor information processing apparatus according to the embodiment of the present invention evaluates the abnormality level to perform control of changing the display content of a screen.

FIG. 11 is a flow chart showing an operation procedure used when the sensor information processing apparatus according to the embodiment of the present invention evaluates the abnormality level to perform control of changing the display content of a screen.

Here, with reference to FIG. 11, operation is described in which, in the sensor information processing apparatus 101, the abnormality level is evaluated on the basis of the frequency by which abnormality is determined, or on the basis of the magnitude of divergence from a threshold, to perform control of changing the display content of the screen.

The operations in step S202 to S210 are the same as the operations in step S102 to S110 shown in FIG. 10.

Next, when the evaluated abnormality level is a low level (YES in step S212), the sensor information processing apparatus 101 varies the display mode of the target icon in a long cycle (step S216) until receiving operation performed by the user for returning the display of the screen to the original one (NO in step S218).

Meanwhile, when the evaluated abnormality level is a high level (NO in step S212), the sensor information processing apparatus 101 varies the display mode of the target icon in a short cycle (step S214) until receiving operation performed by the user for returning the display of the screen to the original one (NO in step S218).

The operation in step S218 is the same as the operation in step S118 shown in FIG. 10.

It should be noted that, in the sensor information processing apparatus according to the embodiment of the present invention, the display control unit 27 is configured to change the display content of the screen including the target icon, in accordance with the content of the abnormality determined by the determination unit 24. However, the present invention is not limited thereto. The display control unit 27 may be configured to display on the screen a constant content independent of the content of the abnormality determined by the determination unit 24.

Meanwhile, in order to monitor the state of a predetermined area, the arrangement of sensors in the predetermined area is displayed on the screen in some cases. In such a case, if a plurality of sensors are arranged in a concentrated manner, a plurality of icons respectively representing the plurality of sensors overlap each other on the screen or are concentrated on the screen, resulting in poor visibility.

In such a case, a method is conceivable in which some icons among the plurality of icons are displayed on the screen or a part of the screen is displayed in an enlarged manner, thereby reducing the number of icons displayed on the screen to improve the visibility. However, for example, when the sensor corresponding to an icon that is no longer displayed on the screen indicates abnormality, the user cannot recognize on the screen the sensor indicating the abnormality.

In contrast to this, in the sensor information processing apparatus according to the embodiment of the present invention, the obtainment unit 21 obtains sensor information indicating the result of measurement performed by a sensor 121. The display control unit 27 performs control of displaying on the screen an icon representing the sensor 121. The determination unit 24 determines the presence/absence of abnormality regarding the sensor information obtained by the obtainment unit 21. Then, in a state where the display control unit 27 is performing control of selectively displaying on the screen the icon of the sensor 121 having been designated, and when abnormality has been determined by the determination unit 24, the display control unit 27 performs control of displaying on the screen a target icon irrespectively of the presence/absence of designation thereof, the target icon being the sensor icon that corresponds to the sensor information for which abnormality has been determined.

According to this configuration, for example, in a case where a sensor 121 corresponding to an icon excluded from candidates for being displayed on the screen indicates abnormality, the icon can be displayed on the screen. Thus, the user can easily recognize on the screen the sensor 121 indicating the abnormality. Therefore, in a configuration in which icons respectively representing sensors in a predetermined area are displayed on a screen, the user is allowed to more reliably recognize abnormality related to a sensor.

In addition, in the sensor information processing apparatus according to the embodiment of the present invention, the display control unit 27 temporally varies the display mode of the target icon.

According to this configuration, the target icon can be made more conspicuous than the other icons on the screen. Thus, the user can more easily recognize on the screen the sensor 121 indicating the abnormality.

In the sensor information processing apparatus according to the embodiment of the present invention, the display control unit 27 causes the other icons than the target icon not to be displayed.

Thus, according to the configuration in which icons to be displayed on the screen are limited to the target icon, the user can reliably recognize on the screen the sensor 121 indicating the abnormality.

In the sensor information processing apparatus according to the embodiment of the present invention, the display control unit 27 changes the display content of the screen including the target icon, in accordance with the content of the abnormality determined by the determination unit 24.

According to this configuration, the user can easily recognize the content of the abnormality related to the sensor 121 on the basis of the display content of the screen. Thus, for example, the user can perform on the sensor 121 an appropriate process in accordance with the display content of the screen.

In the sensor information processing apparatus according to the embodiment of the present invention, the display control unit 27 changes the display content of the screen including the target icon, in accordance with the length of the time period during which abnormality has been continuously determined by the determination unit 24, or in accordance with the magnitude of the number of times by which abnormality has been consecutively determined by the determination unit 24.

According to this configuration, the abnormality level of the measurement target of the sensor 121 can be more properly evaluated on the basis of the display content of the screen.

In the sensor information processing apparatus according to the embodiment of the present invention, the display control unit 27 changes the display content of the screen including the target icon, in accordance with the magnitude of the frequency by which abnormality is determined by the determination unit 24.

According to this configuration, for example, also in a state where abnormality determination and normality determination are repeated, the abnormality level of the measurement target of the sensor 121 can be more properly evaluated on the basis of the display content of the screen.

In the sensor information processing apparatus according to the embodiment of the present invention, the display control unit 27 changes the display content of the screen including the target icon, in accordance with the magnitude of the update frequency of sensor information for which abnormality has been determined by the determination unit 24.

According to this configuration, for example, in a case where the degree of importance of sensor information is reflected in the magnitude of the update frequency, the display content of the screen can be changed in accordance with the degree of importance of the sensor information for which abnormality has been determined.

It should be noted that the embodiment above is merely illustrative in all aspects and should not be recognized as being restrictive. The scope of the present invention is defined by the scope of the claims, and is intended to include meaning equivalent to the scope of the claims and all modifications within the scope.

The above description includes the features in the additional notes below.

[Additional Note 1]

A sensor information processing apparatus including:

an obtainment unit configured to obtain sensor information indicating a result of measurement performed by a sensor;

a display control unit configured to perform control of displaying on a screen an icon indicating the sensor; and a determination unit configured to determine presence/absence of abnormality regarding the sensor information obtained by the obtainment unit, wherein in a state where the display control unit is performing control of selectively displaying on the screen the icon of the sensor having been designated, and when abnormality has been determined by the determination unit, the display control unit performs control of displaying on the screen a target icon irrespectively of presence/absence of designation thereof, the target icon being an icon of a sensor that corresponds to the sensor information for which abnormality has been determined, the sensor information indicates temperature, humidity, illuminance, current, voltage, concentration, acceleration, gyro value, and pressure, which are each the result of measurement performed by the sensor, and communication quality of the sensor information, and the determination unit determines presence/absence of abnormality regarding the sensor information on the basis of magnitude relationship between the measurement result indicated by the sensor information and the communication quality of the sensor information, and a predetermined threshold.

REFERENCE SIGNS LIST

13 display unit
21 obtainment unit
22 storage unit
23 processing unit
24 determination unit
25 counter
26 reception unit
27 display control unit
71 database
101 sensor information processing apparatus
121, 121A, 121B sensor
151 access point
301 sensor information processing system

The invention claimed is:

1. A sensor information processing apparatus comprising:
a display configured to display a GUI (Graphical User Interface) screen including a map area, which represents a layout of a plurality of types of icons corresponding to a plurality of types of registered sensors, respectively, the map area including the icons arranged at aimed display positions corresponding to actual positions of the registered sensors;

a communication device configured to receive sensor information indicating a result of measurement performed by the plurality of types of registered sensors;
a processor configured to determine presence/absence of abnormality regarding the received sensor information; and
a memory configured to store registered sensor information including whether the registered sensor is a display target on the display or the registered sensor is a non-display target on the display, wherein
the processor determines a first icon corresponding to a first sensor as a display target for the map area among the plurality of types of registered sensors on the basis of the registered sensor information,
the processor determines a second icon corresponding to a second sensor as a non-display target for the map area among the plurality of types of registered sensors on the basis of the registered sensor information, and
the processor causes the display to display, at an aimed display position of the aimed display positions, in the map area corresponding to an actual position of the second sensor, the second icon corresponding to the second sensor, contrary to determination of non-display target regarding the second icon, when the sensor information of the second sensor is determined to be abnormal.

2. The sensor information processing apparatus according to claim 1, wherein
the processor temporally varies a display mode of the second icon.

3. The sensor information processing apparatus according to claim 1, wherein
the processor causes the display not to display the first icon corresponding to the first sensor in the map area, when the sensor information of the second sensor is determined to be abnormal.

4. The sensor information processing apparatus according to claim 1, wherein
the processor changes display content of the GUI screen including the second icon, in accordance with content of the determined abnormality.

5. The sensor information processing apparatus according to claim 4, wherein
the processor changes the display content of the GUI screen including the second icon, in accordance with length of a time period during which abnormality has been continuously determined or in accordance with magnitude of the number of times by which the abnormality has been consecutively determined.

6. The sensor information processing apparatus according to claim 4, wherein
the processor changes the display content of the screen including the second icon, in accordance with magnitude of frequency by which the abnormality is determined.

7. The sensor information processing apparatus according to claim 4, wherein
the processor changes the display content of the screen including the second icon, in accordance with magnitude of update frequency of the sensor information by which abnormality has been determined.

8. A sensor information processing method to be used in a sensor information processing apparatus, the sensor information processing apparatus comprising a display configured to display a GUI screen including a map area, which represents a layout of a plurality of types of icons corresponding to a plurality of types of registered sensors, respectively, the map area including the icons arranged at aimed display positions corresponding to actual positions of the registered sensors, the sensor information processing method comprising:
a step of receiving sensor information indicating a result of measurement performed by the plurality of types of registered sensors;
a step of determining presence/absence of abnormality regarding the received sensor information;
a step of storing registered sensor information including whether the registered sensor is a display target on the display or the registered sensor is a non-display target on the display;
a step of determining a first icon corresponding to a first sensor as a display target for the map area among the plurality of types of registered sensors on the basis of the registered sensor information;
a step of determining a second icon corresponding to a second sensor as a non-display target for the map area among the plurality of types of registered sensors on the basis of the registered sensor information; and
a step of causing the display to display, at an aimed display position of the aimed display positions, in the map area corresponding to an actual position of the second sensor, the second icon corresponding to the second sensor, contrary to determination of non-display target regarding the second icon, when the sensor information of the second sensor is determined to be abnormal.

9. A non-transitory computer readable storage medium storing a sensor information processing program to be used in a sensor information processing apparatus, the sensor information processing apparatus comprising a display configured to display a GUI screen including a map area, which represents a layout of a plurality of types of icons corresponding to a plurality of types of registered sensors, respectively, the map area including the icons arranged at aimed display positions corresponding to actual positions of the registered sensors, the sensor information processing program causing a computer to execute:
a step of receiving sensor information indicating a result of measurement performed by the plurality of types of registered sensors;
a step of determining presence/absence of abnormality regarding the received sensor information;
a step of storing registered sensor information including whether the registered sensor is a display target on the display or the registered sensor is a non-display target on the display;
a step of determining a first icon corresponding to a first sensor as a display target for the map area among the plurality of types of registered sensors on the basis of the registered sensor information;
a step of determining a second icon corresponding to a second sensor as a non-display target for the map area among the plurality of types of registered sensors on the basis of the registered sensor information; and
a step of causing the display to display, at an aimed display position of the aimed display positions, in the map area corresponding to an actual position of the second sensor, the second icon corresponding to the second sensor, contrary to determination of non-display target regarding the second icon, when the sensor information of the second sensor is determined to be abnormal.

* * * * *